Feb. 7, 1933.    C. A. BRANDT    1,896,216
FLEXIBLE GAS TIGHT JOINT
Filed Aug. 19, 1931
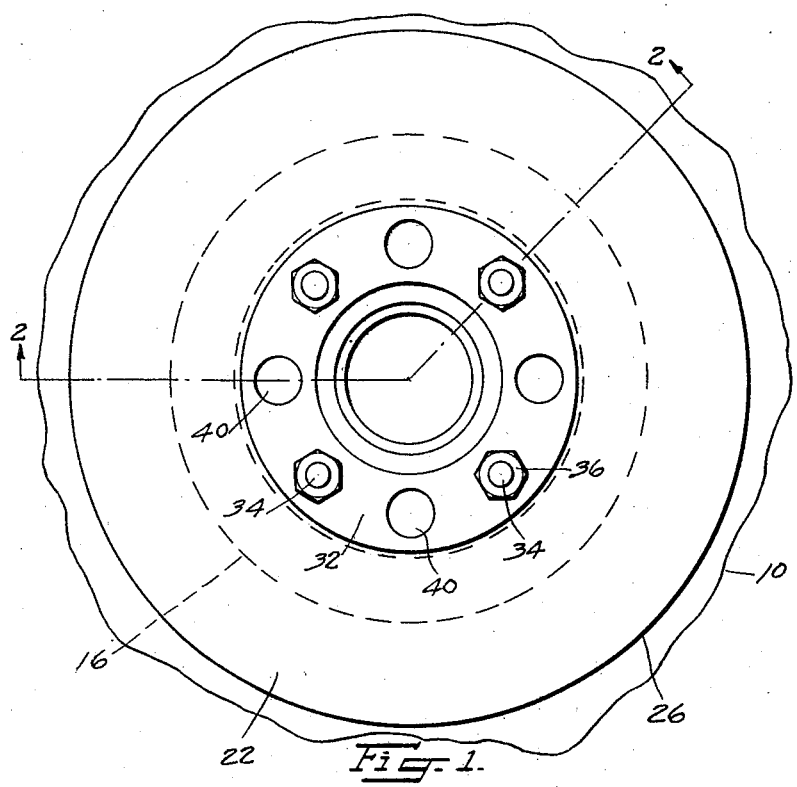
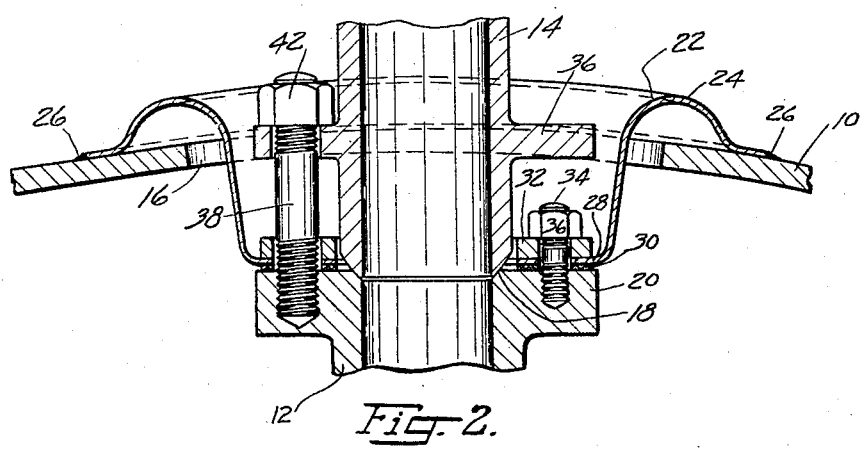
Carl A. Brandt
INVENTOR.
BY O. V. Thiele
ATTORNEYS.

Patented Feb. 7, 1933

1,896,216

UNITED STATES PATENT OFFICE

CARL A. BRANDT, OF GREAT NECK, NEW YORK, ASSIGNOR TO THE SUPERHEATER COMPANY, OF NEW YORK, N. Y.

FLEXIBLE GAS TIGHT JOINT

Application filed August 19, 1931. Serial No. 558,050.

This invention relates to gas tight joints used at points where it is desired to bring a pipe carrying a fluid or gas under pressure through the walls of a vessel which may be under pressure or vacuum.

In the cases of locomotive smoke boxes, evaporators, vacuum pans, ejector condensers, and like apparatus, it is necessary to carry a pipe for steam or other fluid through the wall of the apparatus. As the interior chamber of such apparatus is either under pressure or under vacuum, it is necessary to prevent leakage at the point the pipe passes through the wall of the chamber. However, owing to the changes in temperature of the different parts, especially when starting up and shutting down a piece of apparatus, there is a relative motion of the parts due to their thermal expansion and contraction, which makes it difficult to prevent leakage between the wall and pipe when a joint of ordinary type is employed.

It is the purpose of the present invention to provide an improved flexible joint structure adapted to operate satisfactorily under the conditions just described.

The novel features of my invention are pointed out in the appended claims. The invention itself, however, together with its objects and advantages, will best be understood from a detailed description of a particular gas tight flexible joint in accordance with my invention and such a description will now be given, by way of example and in connection with the accompanying drawing, of a joint which is an illustrative embodiment of my invention. In said drawing:

Fig. 1 is a plan of a fragment of the shell of the smoke-box of a locomotive boiler having my improved joint applied thereto, the outer section of the pipe being omitted for purposes of illustration.

Fig. 2 is a section on the line 2—2 of Fig. 1, the extension pipe being shown in place.

In the drawing, the shell of the smoke-box is indicated at 10. Within the smoke-box is a header 12, or other chamber containing fluid, and the interior of which it is desired to connect with a pipe 14 exterior to the shell 10. The arrangement shown is one commonly employed and in which the header 12 is the superheated steam header and the pipe 14 is the auxiliary pipe running to the turret in the cab of the locomotive. In the arrangement shown, the shell 10 has an aperture 16 therein through which the pipe 14 passes, the inner end of pipe 14 making a steam tight joint at 18 where it seats on the shoulder 20 on the header 12. To prevent leakage of air into the interior of the smoke-box through the aperture 16, means are employed including a flexible shield or flashing 22 which has an annular shape, in plan, as shown in Fig. 1. In cross-section, however, the shield 22 preferably is curved so that it forms an annular outward bulge 24 between its larger edge and the edge of the aperture 16. From the crest of bulge 24, the shield bends back toward the shell 10 and runs inwardly through the aperture 16 and has a flat annular portion 28 near its smaller inner edge, the cross-section of shield 22 having a double Z effect providing ample flexibility. The larger outer edge of the shield 22 is shown as resting against the outer face of the shell 10 and as welded thereto along a line 26 surrounding aperture 16 so as to prevent leakage of air between the shell and shield around the outer edge of the shield. However, I do not limit myself to the form of shield shown or to fixing it to the outer surface of shell 10. The flat inner portion or part 28 of shield 22 forms a seat which lies parallel to the surface 20 so that an air tight joint is formed between the shoulder 20 and part 28 by inserting a flat gasket ring 30 between these two parts and clamping them together. For this purpose, the annular metal piece of ring 32 is preferably employed in contact with the outer surface of part 28 and bolts 34 run through parts 28, 30 and 32 and into the shoulder 20 so that the nuts 36 on the bolt 34 can be screwed down to force the parts tightly together. The ring 32 surrounds the seat 18 but does not form a joint with it, so that if there is leakage at the seat 18, it escapes freely to the outer air instead of to the interior of the shell. Also it can be immediately detected by a person viewing the apparatus from the outside.

For holding the pipe 14 against seat 18, a flange 36 is provided which may be integral with the pipe 14 as shown. Bolts 38 may then be run through holes in the flange 36 and corresponding holes 40 in the ring 32 and into the shoulder 20 so that nuts on the ends of the bolts 38 may be screwed down to draw the pipe 14 firmly against the seat 18 of the shoulder 20. As appears clearly in Fig. 1, the holes 40 in ring 32 for the bolts 38 can conveniently be alternated with those for the bolts 34. It will be seen further that the arrangement above described can be readily assembled and disassembled and made tight against leakage of air or gas. It also provides ample flexibility.

While I have described the joint in accordance with my present invention as applied to a locomotive smoke-box, it will be understood that it can be applied wherever flexible fluid tight joints are desired.

What I claim is:

1. The combination with a chamber wall having an aperture therethrough, a pipe, and a member within said chamber and having a passage connected with the passage in said pipe, of means adapted to prevent leakage between the interior of said chamber and the atmosphere comprising a flexible sheet having a tight joint with said shell along a line surrounding said aperture, means for forming a tight joint between the inner edge of said sheet and said member and arranged to permit passage from the end of said pipe to the atmosphere in case there is leakage at the end of the pipe, and means for drawing said pipe against said member to normally prevent leakage therebetween.

2. The combination as set forth in claim 1 and in which the pipe has a flange thereon spaced longitudinally thereof from the means at the inner edge of the flexible sheet together with bolts extending between said flange and the member and passing through the joint between the member and the sheet.

3. The combination as set forth in claim 1 and in which the flexible sheet is attached to the outer face of the shell and curves first away from the shell and then through the aperture therein.

4. The combination with a chamber wall having an aperture therethru, a pipe, and a member within said chamber and having a passage connected with the passage in said pipe, of means adapted to prevent leakage between the interior of said chamber and the atmosphere comprising a flexible sheet having a tight joint with said shell along a line surrounding said aperture, the member within said chamber having a joint with the inner edge of said flexible member along a surface at right angles to said passage, and said pipe having a joint with the member within said chamber surrounded but spaced from the joint between such member and the pipe to cause any leakage from said passage to pass outside said flexible member.

5. The combination as set forth in claim 4 together with a flange on the pipe spaced longitudinally thereof from the end of the member within the chamber and bolts passing thru said flange and thru the joint between such member and the flexible member.

CARL A. BRANDT.